United States Patent
Yang

(10) Patent No.: US 8,059,282 B2
(45) Date of Patent: Nov. 15, 2011

(54) REFLECTIVE FILM THICKNESS MEASUREMENT METHOD

(75) Inventor: Fu-Shiang Yang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 485 days.

(21) Appl. No.: 12/198,988

(22) Filed: Aug. 27, 2008

(65) Prior Publication Data
US 2009/0168079 A1 Jul. 2, 2009

(30) Foreign Application Priority Data

Dec. 31, 2007 (TW) .............................. 96151611 A
Apr. 25, 2008 (TW) .............................. 97115471 A

(51) Int. Cl.
*G01B 11/28* (2006.01)
(52) U.S. Cl. .............. 356/630; 250/559.27; 250/559.28; 356/632; 356/445; 702/170
(58) Field of Classification Search ............. 250/559.27, 250/559.28; 356/630, 632, 445; 702/170
See application file for complete search history.

(56) References Cited

U.S. PATENT DOCUMENTS

| 5,305,239 A | * | 4/1994 | Kinra ............................... 73/602 |
| 7,869,057 B2 | * | 1/2011 | De Groot ........................ 356/511 |
| 2006/0077385 A1 | | 4/2006 | Wang et al. |

* cited by examiner

*Primary Examiner* — Gregory J Toatley
*Assistant Examiner* — Iyabo S Alli
(74) *Attorney, Agent, or Firm* — Rabin & Berdo, P.C.

(57) ABSTRACT

A reflective film thickness measurement method includes reading an original spectral image of a thin film measured by a broadband light source passing through a measurement system, transforming the original spectral image into a broadband reflectance wavelength function and then into a broadband frequency-domain function, dividing the broadband frequency-domain function by a single-wavelength frequency-domain function to obtain an ideal frequency-domain function, inverse-transforming the ideal frequency-domain function into an ideal reflectance wavelength function, and performing a curve fitting on the ideal reflectance wavelength function and a reflectance wavelength thickness general expression, so as to obtain a thickness of the thin film. A spectral image spatial axis direction processing method is performed to eliminate optical aberration in a deconvolution manner, so as to obtain spectral images of high spatial resolution.

29 Claims, 15 Drawing Sheets

REFLECTIVE FILM THICKNESS MEASUREMENT METHOD

CROSS-REFERENCE TO RELATED APPLICATIONS

This non-provisional application claims priority under 35 U.S.C. §119(a) on Patent Application No(s). 096151611 filed in Taiwan, R.O.C. on Dec. 31, 2007 the entire contents of which are hereby incorporated by reference.

This non-provisional application claims priority under 35 U.S.C. §119(a) on Patent Application No(s). 097115471 filed in Taiwan, R.O.C. on Apr. 25, 2008 the entire contents of which are hereby incorporated by reference.

BACKGROUND OF THE INVENTION

The present invention relates to a method of measuring thin film thickness, and more particularly to a reflective microscopy film thickness measurement method.

Thin films are broadly applied in the industry, for example, the flat panel display (FPD) industry. The color filter includes a plurality of films, such as R, G, B color filter, photo spacer (PS), multi-domain vertical alignment (MVA) material, and indium tin oxide (ITO), each having a different function. The color filter film determines the color performance, the thickness of the PS film influences the operation performance of liquid crystals, and the thickness of the MVA film further influences the viewing angle performance of the liquid crystal panel. Therefore, it has become a critical technique to accurately detect the thickness and uniformity of each film.

The thin film thickness measurement technique has been developed for several years and has been widely applied. In recent years, the area of the sample under measurement becomes increasingly larger, and the process speed is increasingly increased, and thus a quick and accurate measurement becomes more and more important. The conventional thin film thickness measurement techniques mostly adopt a single point measuring method. When the film thickness uniformity of the entire sample is measured, the probe or sample must be moved in two dimensions, which cost too much time in measuring. Further, along with the development of the process technique, the film thickness measurement and monitoring in small region (e.g., pixel size) is becoming more and more important. Therefore, a measuring method capable of quickly and accurately detecting the film thickness uniformity of a sample with a larger area and also capable of monitoring the film thickness in small region is urgently needed in the industry field.

Among the film thickness measurement techniques, the spectral reflectance measurement method is performed by measuring a reflectance spectrum when an incident direction of a light source is perpendicular to a sample. When a broadband light source is incident in perpendicular to the sample, the reflected light from the bottom of the film is refracted to the air, and interferes with the reflected light from the surface of the film. As shown in a schematic view of a reflectance spectrum in FIG. 1, a horizontal axis in the figure represents the wavelength in a unit of nm, and a vertical axis represents the reflectance. When the light reflected from the bottom surface of the film and the light reflected from the surface of the film are in phase, a constructive interference is generated, and the reflectance has an extremely large value, i.e., crest 10 in FIG. 1. However, when the two are out of phase, a destructive interference is generated, and the reflectance has an extremely small value, for example, trough 12 in FIG. 1.

The interference is relevant to optical path difference (OPD), the OPD is relevant to film thickness and reflectance of the film property, and the reflectance is a function of the wavelength. Thus, under the same film property conditions, along with the increase of the film thickness, the number of crests of the reflectance curve is increased, which can be seen from FIGS. 2A, 2B, and 2C. FIG. 2A is a reflectance spectrum obtained at a thickness of 500 Å (10-10 meter), FIG. 2B is a reflectance spectrum obtained at a thickness of 5000 Å, and FIG. 2C is a reflectance spectrum obtained at a thickness of 20,000 Å. It can be seen clearly from comparison that the thicker the thickness is, the more the number of crests and troughs in the same wavelength interval is. Therefore, the thickness of the measured film can be obtained by performing curve fitting on the reflectance spectrum of the known thickness and the measured reflectance spectrum.

The above reflective measurement method of thin film thickness can be used to obtain the thickness of the thin film. However, in actual measurement, the read reflectance spectrum may have poor spectrum resolution and spatial resolution due to the optical aberration. That is to say, when a single-wavelength light source after passing through a measurement system is irradiated to a thin film and reflected to a photo-detecting element, a spectrum read by the photo-detecting element may be the emitted single-wavelength reflected light theoretically. But in practice, after the single-wavelength light source passes the optical path of the entire measurement system, a reflectance interference spectrum much larger than the single-wavelength bandwidth is read on the photo-detecting element due to the optical aberration. Referring to FIG. 3, it can be seen that the wavelength range in the reflectance interference spectrum is spread to about 4 nm, which varies depending on different measurement systems.

Therefore, when the thickness of a thin film is measured by a light source of a broadband spectrum passing through a measurement system, a spread phenomenon is generated in the reflectance interference spectrum read by the photo-detecting element, as shown in FIG. 4. The spread phenomenon is formed by the accumulation of single-wavelength light sources, and thus the measured spectral resolution may be deteriorated due to the optical aberration. Besides, the spatial image resolution has the same situations.

SUMMARY OF THE INVENTION

One aspect of the present invention provides a reflective microscopy film thickness measurement method, and could offer sufficient spectral resolution and spatial image resolution.

In an embodiment of the present invention, a reflective film thickness measurement method including the following steps is provided, which includes the following steps. A broadband reflectance wavelength function $M(\lambda)$ obtained by measuring a thin film with a broadband light source passing through a measurement system is read. The broadband reflectance wavelength function $M(\lambda)$ is transformed to a broadband frequency-domain function $M(f)$. The broadband frequency-domain function $M(f)$ is divided by a single-wavelength frequency-domain function $h(f)$, so as to obtain an ideal frequency-domain function $S(f)$. The ideal frequency-domain function $S(f)$ is inverse-transformed into an ideal reflectance wavelength function $S(\lambda)$. Finally, a curve fitting is performed on the ideal reflectance wavelength function $S(\lambda)$ and a reflectance wavelength thickness general expression, so as to obtain a thickness of the thin film.

In another embodiment of the present invention, a spectral image processing method for improving spatial resolution is provided, in which a microscopy imaging system is used to read an image. The method includes the following steps. An original spectral image of the image obtained by a broadband light source passing through the microscopy imaging system is read. A deconvolution operation is performed on the original spectral image and a spread function PSF($\lambda$, h), so as to obtain a reduced spectral image.

In yet another embodiment of the present invention, a reflective film thickness measurement method is provided, which incorporates the above two embodiments to measure the film thickness with improved spatial resolution and spectral resolution. An original spectral image of an image obtained by a broadband light source passing through a microscopy imaging system is read in sequence. A deconvolution operation is performed on the original spectral image and a spread function PSF($\lambda$, h), so as to obtain a reduced spectral image. A broadband reflectance wavelength function M($\lambda$) is captured from the reduced spectral image. The broadband reflectance wavelength function M($\lambda$) is transformed into a broadband frequency-domain function M(f). The broadband frequency-domain function M(f) is divided by a single-wavelength frequency-domain function h(f), so as to obtain an ideal frequency-domain function S(f). The ideal frequency-domain function S(f) is inverse-transformed into an ideal reflectance wavelength function S($\lambda$). A curve fitting is performed on the ideal reflectance wavelength function S($\lambda$) and a reflectance wavelength thickness general expression, so as to obtain a thickness of the thin film.

In still another embodiment of the present invention, a reflective film thickness measurement method is provided. An original spectral image I($\lambda$, h) obtained by measuring a thin film with a broadband light source passing through a measurement system is read, and the original spectral image I($\lambda$, h) includes reflectance values of various object height of a slit in the microscopy imaging system to corresponding various wavelengths of the broadband light source. A deconvolution operation is performed on the original spectral image I($\lambda$, h) and a two-dimensional spread integrated function PSF2($\lambda$, h), so as to obtain a reduced spectral image I'($\lambda$,h). An ideal reflectance wavelength function S($\lambda$) corresponding to a specific object height is captured from the reduced spectral image I'($\lambda$, h). A curve fitting is performed on the ideal reflectance wavelength function S($\lambda$) and a reflectance wavelength thickness general expression, so as to obtain a thickness of the thin film corresponding to the specific object height.

Through the measurement with the reflective film thickness measurement method, the optical aberration may be properly removed from the read spread spectrum, so as to obtain an accurate measurement value of the film thickness. By using the spectrum spatial axis direction image processing method of the present, the spread phenomenon generated by the optical aberration can also be eliminated, so as to obtain spectral images of high spatial resolution.

BRIEF DESCRIPTION OF THE DRAWINGS

The present invention will become more fully understood from the detailed description given herein below for illustration only for, and thus are not limitative of the present invention, and wherein.

DETAILED DESCRIPTION OF THE INVENTION

Figure 5:
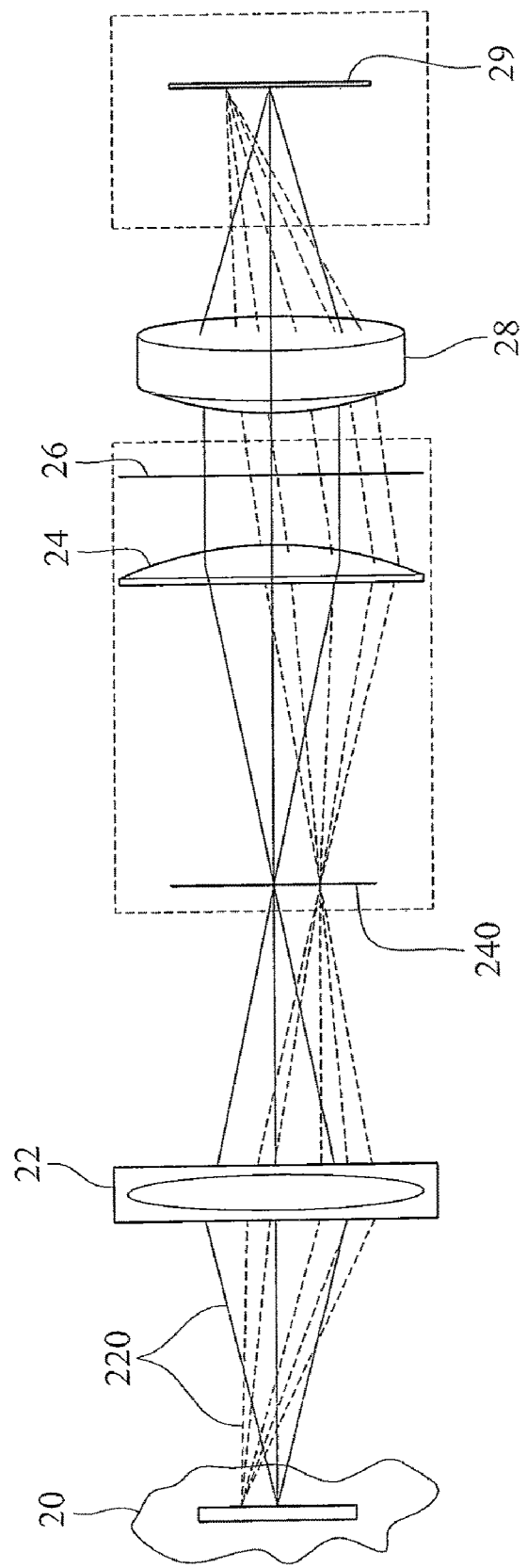
FIG. 5 is a schematic structural view of a conventional spectral image measurement system.

In a reflective film thickness measurement method of the present invention, a measurement system (e.g., a microscopy imaging system) is used to measure a thickness of a thin film, and an embodiment of the measurement system is shown in FIG. 5. In the figure, the spectral image measurement system includes an image side telecentric lens 22 for collecting light energy 220 of the thin film 20, a slit 240, an aspherical lens 24 for collimating the beam from the slit 240, a wavelength dispersion element 26 for carrying the collimated beam and dispersing the beam into sub-beams, an achromatic lens 28 for focusing the sub-beams, and a photo-detecting element 29 for detecting light intensities of the sub-beams. The wavelength dispersion element is used for dispersing different wavelengths of the beam into sub-beams with different emergence angles, the wavelength dispersion element 26 may be a transmission diffraction grating, and the photo-detecting element 29 is formed by a plurality of photo-detectors arranged in a two-dimensional array, and is, for example, but not limited to, a image spectrometer.

Figure 6A:
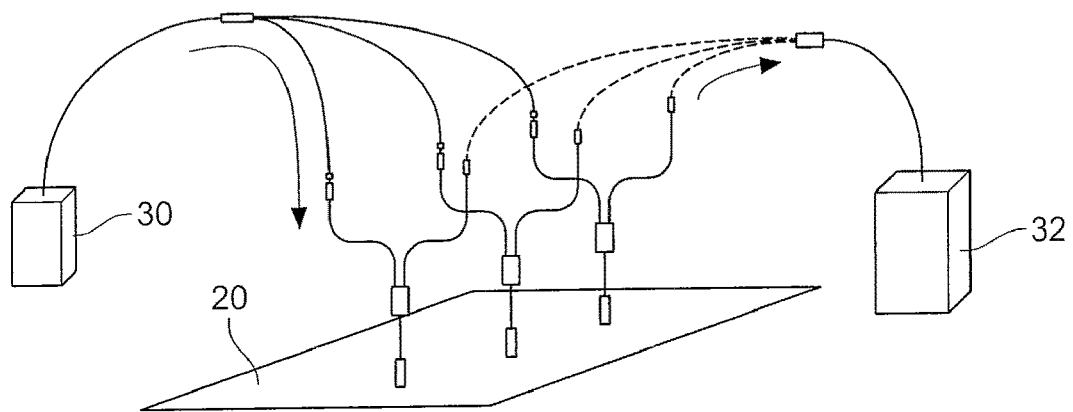
FIG. 6A is a schematic structural view of a conventional reflective thin film thickness measurement architecture.
Figure 6B:
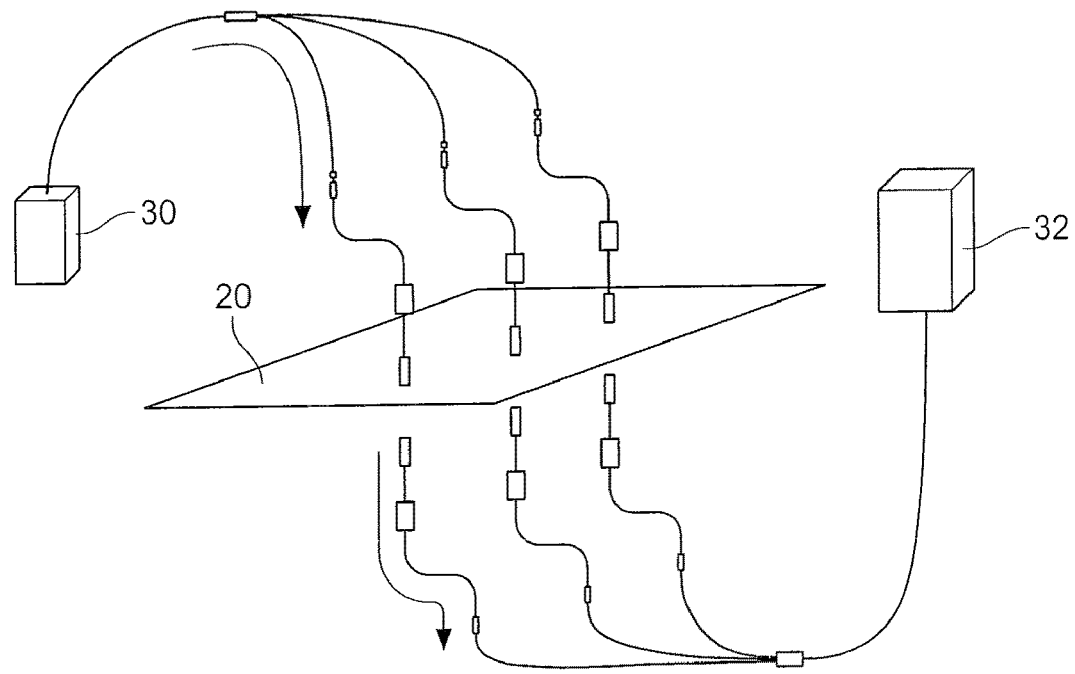
FIG. 6B is a schematic structural view of a conventional transmission thin film thickness measurement architecture.

The measurement system can be applied in a transmission thin film thickness measurement architecture and a reflective thin film thickness measurement architecture, which can be known with reference to FIGS. 6A and 6B. FIG. 6A is a schematic view of a reflective thin film thickness measurement architecture, it can be seen with reference to the arrows in the figure that, in the architecture, a broadband light source 30 is irradiated on a surface of a thin film 20, the light reflected by the thin film 20 is then collected and read by an image spectrometer 32, and the image spectrometer 32 performs a film thickness analysis on the thin film 20 by using the read reflectance interference spectrum, so as to obtain the film thickness.

FIG. 6B is a schematic view of a transmission thin film thickness measurement architecture, it can be seen with reference to the arrows in the figure that, the broadband light source 30 is irradiated to the surface of the thin film 20, light passing through the thin film 20 is collected and read by the image spectrometer 32, and the image spectrometer 32 performs the film thickness analysis on the thin film 20 by using the read reflectance interference spectrum, so as to obtain the film thickness.

Figure 7:
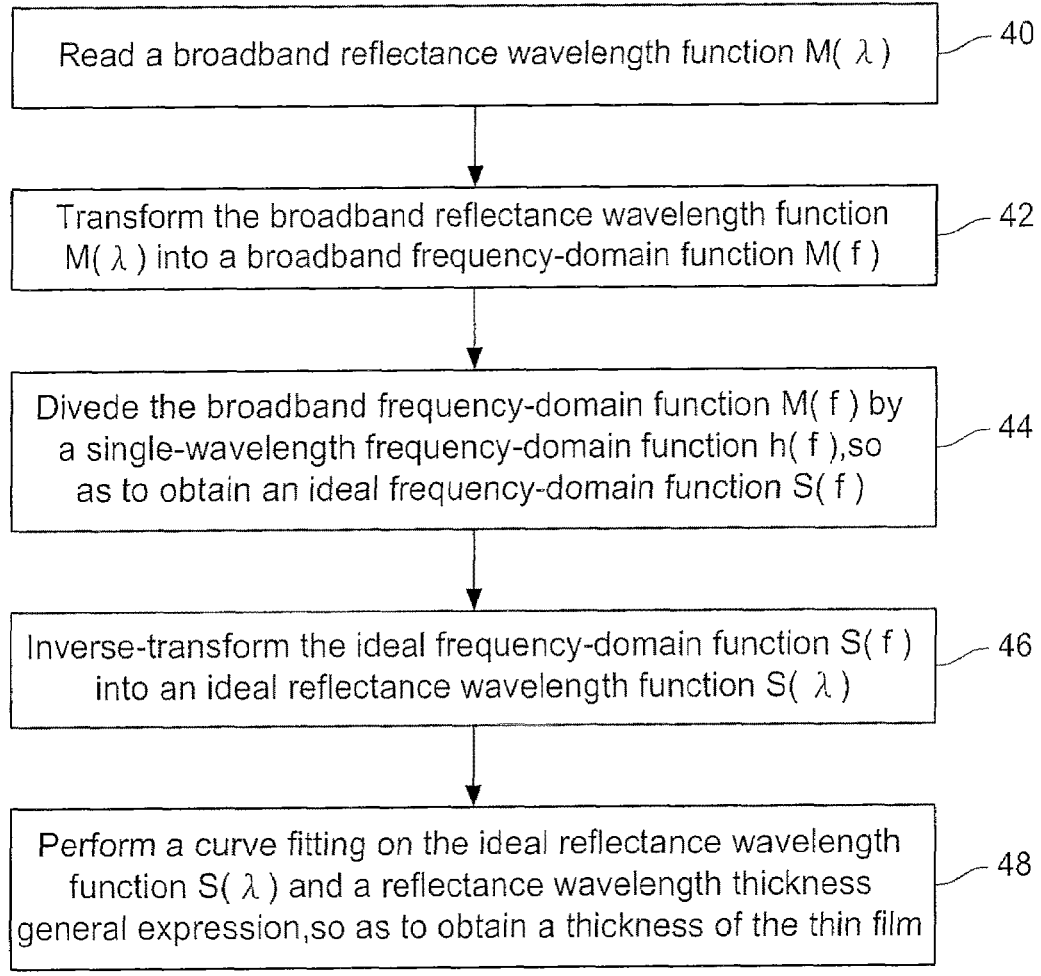
FIG. 7 is a schematic flow chart of processes of a reflective film thickness measurement method according to the present invention.

FIG. 7 is a schematic flow chart of processes of a reflective film thickness measurement method according to the present invention. Referring to FIG. 7, the reflective film thickness measurement method of the present invention includes the following steps. In Step 40, a broadband reflectance wavelength function $M(\lambda)$ obtained by measuring a thin film with a broadband light source passing through a measurement system is obtained. In Step 42, the broadband reflectance wavelength function $M(\lambda)$ is transformed into a broadband frequency-domain function $M(f)$. In Step 44, the broadband frequency-domain function $M(f)$ is divided by a single-wavelength frequency-domain function $h(f)$, so as to obtain an ideal frequency-domain function $S(f)$. In Step 46, the ideal frequency-domain function $S(f)$ is inverse-transformed into an ideal reflectance wavelength function $S(\lambda)$. In Step 48, a curve fitting is performed on the ideal reflectance wavelength function $S(\lambda)$ and a reflectance wavelength thickness general expression, so as to obtain a thickness of the thin film.

Figure 4:
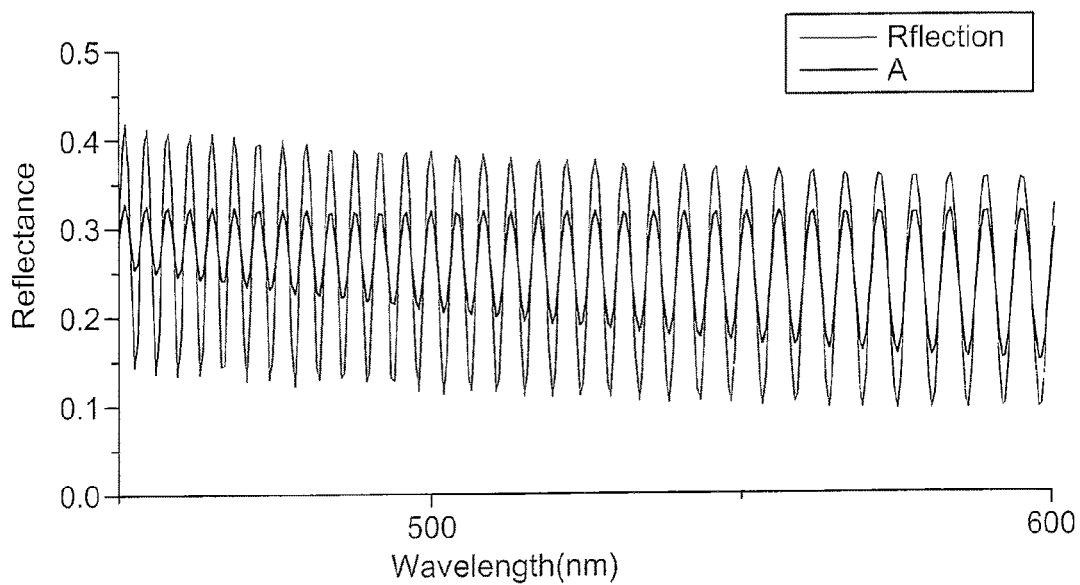
FIG. 4 is a schematic view of a conventional reflectance interference spectrum obtained by measurement with a broadband wavelength light source and spread due to the optical aberration.

The broadband reflectance wavelength function $M(\lambda)$ read in Step 40 refers to, for example, the reflectance interference spectrum read in the measurement architecture of FIG. 6A or FIG. 6B. In the figures, the horizontal axis represents the wavelength, the vertical axis represents the reflectance, and the broadband reflectance wavelength function $M(\lambda)$ can also be referred to as a broadband spectral function. The reflectance interference spectrum is, for example, the actually read schematic view of reflectance interference spectrum shown in FIG. 4 which is deteriorated due to the optical aberration spread. It can be seen in the figure that a secondary crest 11 and a secondary trough 13 having smaller amplitude exist between each crest 10 and each trough 12, and the secondary crest 11 and the secondary trough 13 are a signal induced by the optical aberration, which will deteriorate the spectral resolution.

Figure 9:
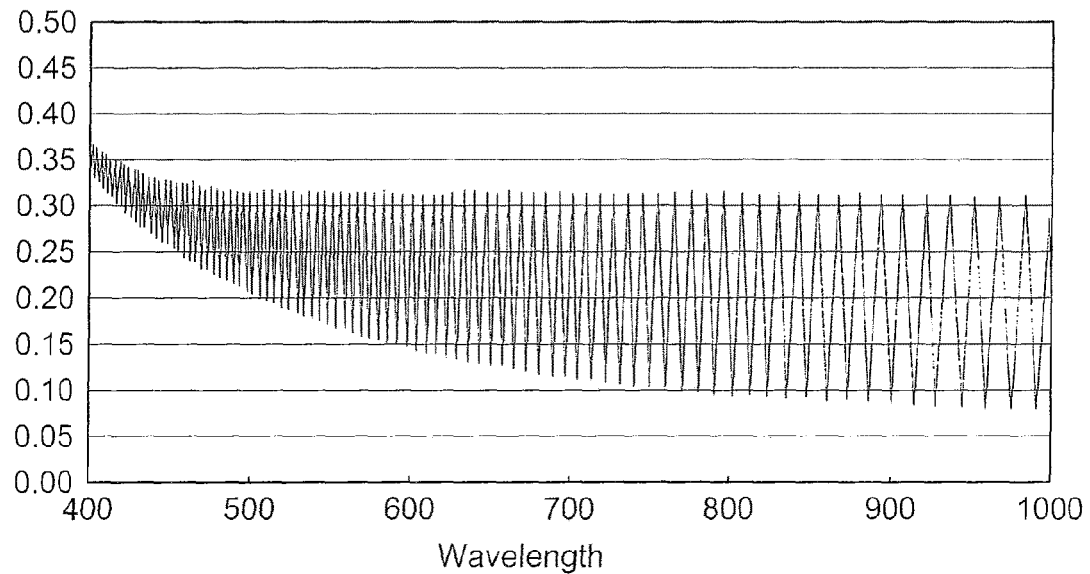
FIG. 9 is a schematic view of a broadband reflectance wavelength function M($\lambda$) obtained by measurement according to the present invention.

The information in the previously read reflectance interference spectrum may be transformed into a broadband reflectance wavelength function $M(\lambda)$, as shown in FIG. 9. The range of the broadband may be, but not limited to, 350-850 nm, and in FIG. 9, the wavelength range is, for example, 400-1000 nm. In Step 42, the broadband reflectance wavelength function $M(\lambda)$ is transformed into a broadband frequency-domain function $M(f)$, and such a transform method of transforming wavelength into frequency may be, but not limited to Fourier transform or fast Fourier transform.

In Step 44, the broadband frequency-domain function $M(f)$ is divided by a single-wavelength frequency-domain function $h(f)$ from single-wavelength reflectance wavelength function $h(\lambda)$, so as to obtain an ideal frequency-domain function $S(f)$. The single-wave frequency-domain function $h(f)$ can be obtained with the following steps.

Figure 10:
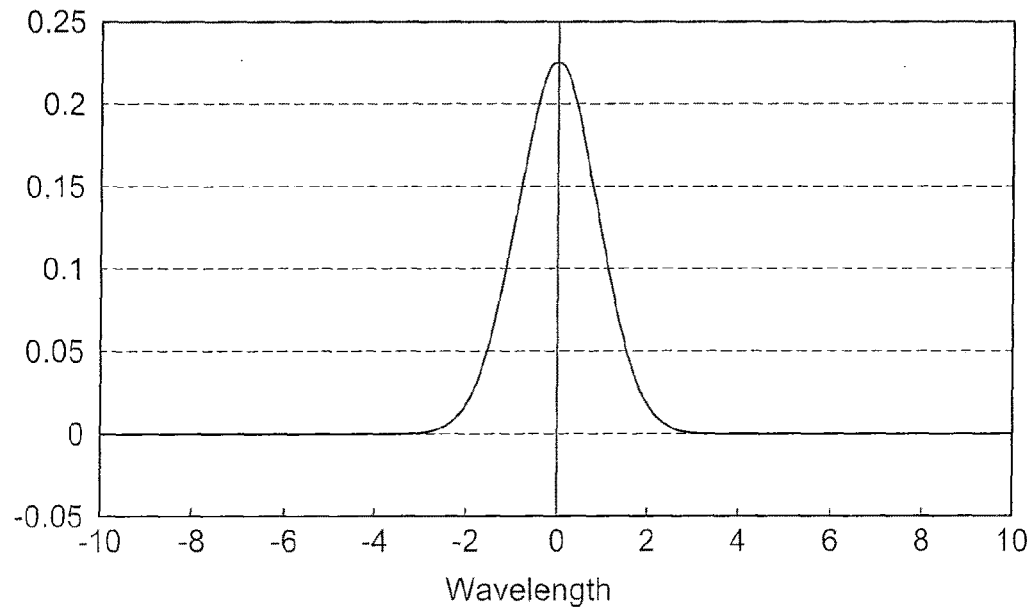
FIG. 10 is a schematic view of a single-wavelength reflectance wavelength function h($\lambda$) obtained by measurement according to the present invention.

First, a single-wavelength reflectance wavelength function $h(\lambda)$ obtained by a single-wavelength light source passing through the measurement system is read, as shown in FIG. 10. Next, the single-wavelength reflectance wavelength function $h(\lambda)$ is transformed into the single-wavelength frequency-domain function $h(f)$.

Figure 3:
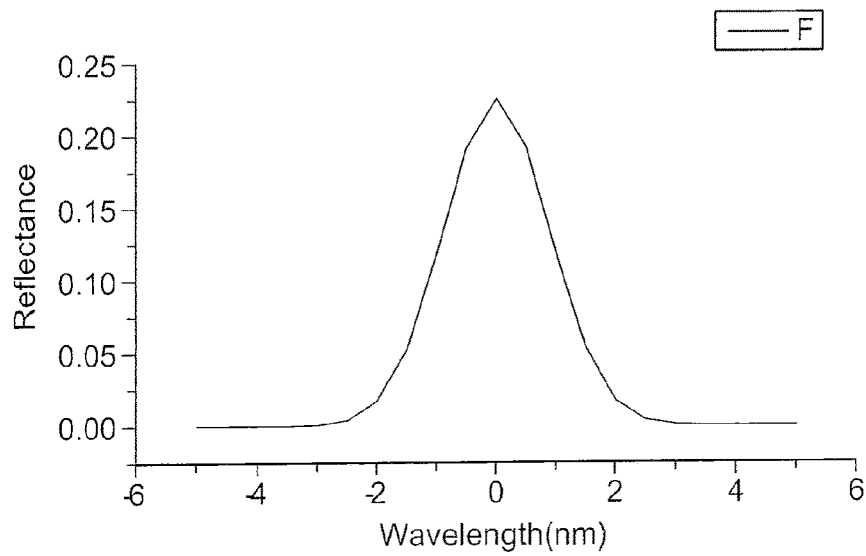
FIG. 3 is a schematic view of a conventional reflectance interference spectrum obtained by measurement with a single-wavelength light source and spread due to optical aberration.

The single-wavelength reflectance wavelength function $h(\lambda)$ here is the reflectance wavelength function $h(\lambda)$ in the reflectance interference spectrogram of FIG. 3, and FIG. 3 is a read reflectance interference spectrogram of the single-wavelength light source passing through the measurement system, which is spread due to optical aberration. The single-wavelength reflectance wavelength function $h(\lambda)$ indicates the spread extent due to the optical aberration when a single-wavelength light source passes through such a measurement system. The transform method for transforming the single-wavelength reflectance wavelength function $h(\lambda)$ into the single-wavelength frequency-domain function $h(f)$ may be, but not limited to, Fourier transform or fast Fourier transform.

Figure 11:
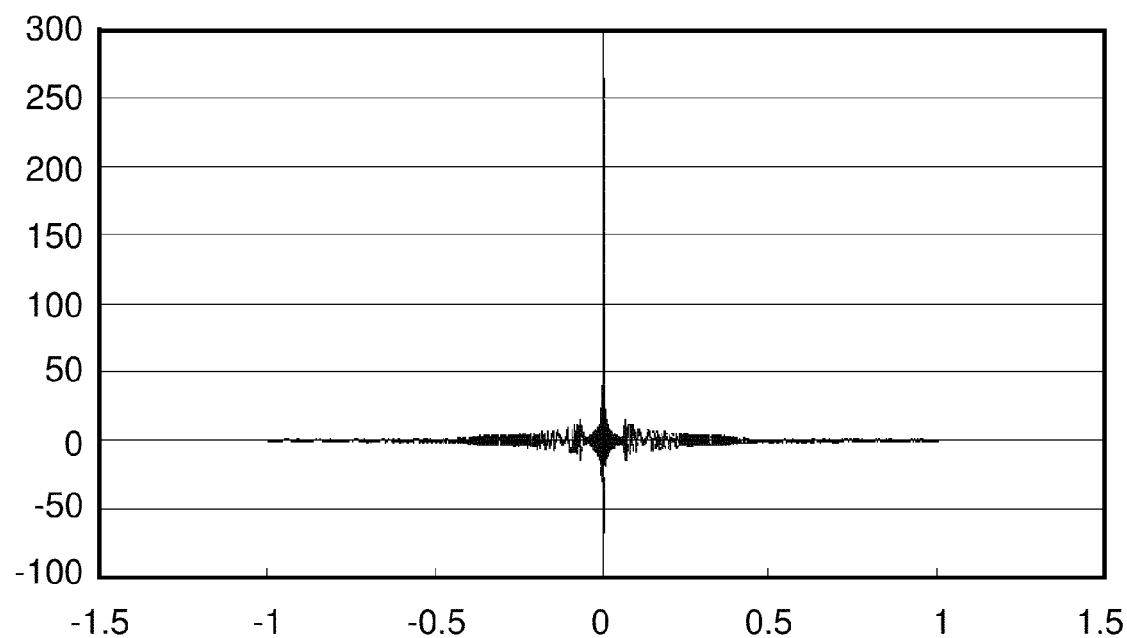
FIG. 11 is a schematic view of a real part of an ideal frequency-domain function S(f) obtained by calculation according to the present invention.
Figure 12:
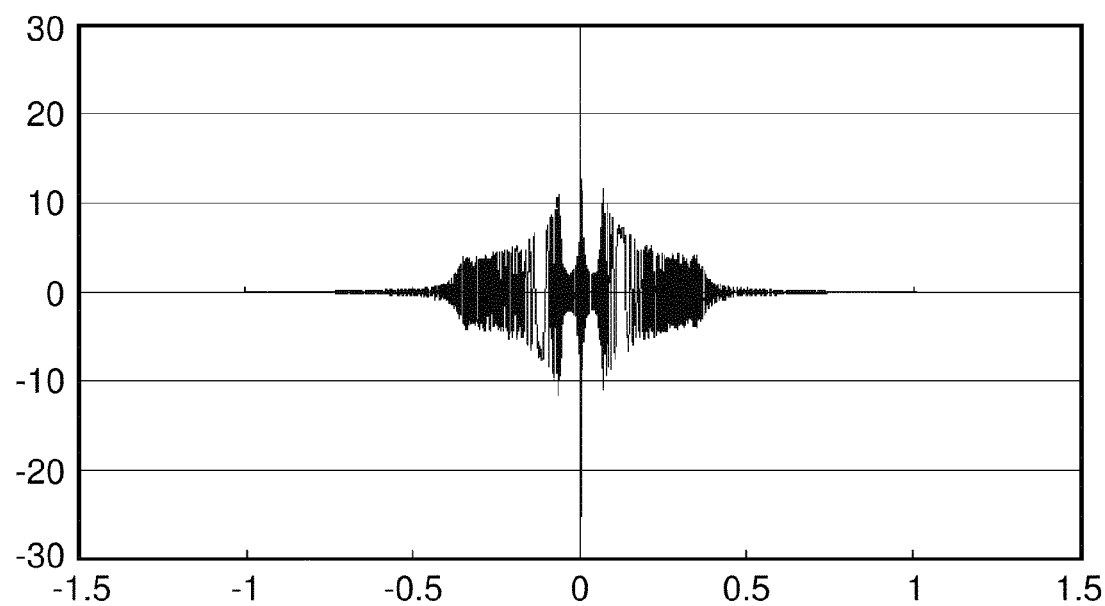
FIG. 12 is a schematic view of an imaginary part of the ideal frequency-domain function S(f) obtained by calculation according to the present invention.

Therefore, after the Step 44 of dividing the broadband frequency-domain function $M(f)$ by the single-wavelength frequency-domain function $h(f)$, a real part and an imaginary part of the ideal frequency-domain function $S(f)$ can be obtained, as shown in FIGS. 11 and 12. FIG. 11 is a schematic view of the real part of the ideal frequency-domain function $S(f)$, and FIG. 12 is a schematic view of the imaginary part of the ideal frequency-domain function $S(f)$, in which the horizontal axis represents the frequency of power spectral amplitude, and the vertical axis represents the amplitude of the power spectral amplitude.

In Step 48, a curve fitting is performed on the ideal reflectance wavelength function $S(\lambda)$ and a reflectance wavelength thickness general expression, so as to obtain a thickness of the thin film. The reflectance wavelength thickness general expression is a general function expression of wavelength and film thickness deduced from Fresnel Equation.

The process of obtaining the thickness of the thin film by using the Fresnel Equation to perform the curve fitting is briefly described below. Among film optical parameters, refraction index (n), extinction coefficient (k), and thickness (d) are relatively important. As the reflectance of the interface between air and film material is in a form of complex number, the real part and imaginary part of the film material reflectance are respectively referred to as the refraction index (n) and the extinction coefficient (k). According to the Fresnel Equation, when the incident light wavelength ($\lambda$) is set, parameter values in the function deduced by the Fresnel Equation are adjusted, and a standard curve (i.e., one of the reflectance wavelength thickness general expressions) is depicted. When a mean square error between the standard curve and the read curve (the ideal reflectance wavelength function S(λ) in the present invention) is minimum, the parameter is a solution, that is, the thickness in the parameter is the film thickness of the thin film under measurement.

The above method of the present invention improves the spectral resolution, and the principle thereof is described herein below. It can be known from convolution principle that, when it is assumed that the ideal reflectance wavelength function is S(λ), and the spread function (the single-wavelength reflectance wavelength function) of optical aberration (generated due to the light slit and aberration) is h(λ), the spectrum (function) obtained by measurement is $$M(\lambda) = \int_{-\infty}^{\infty} S(\lambda') \cdot h(\lambda' - \tau) d\lambda' = S(\lambda) * h(\lambda).$$

If the above function is transformed into frequency, M(f) =S(f)*h(f).

Figure 13:
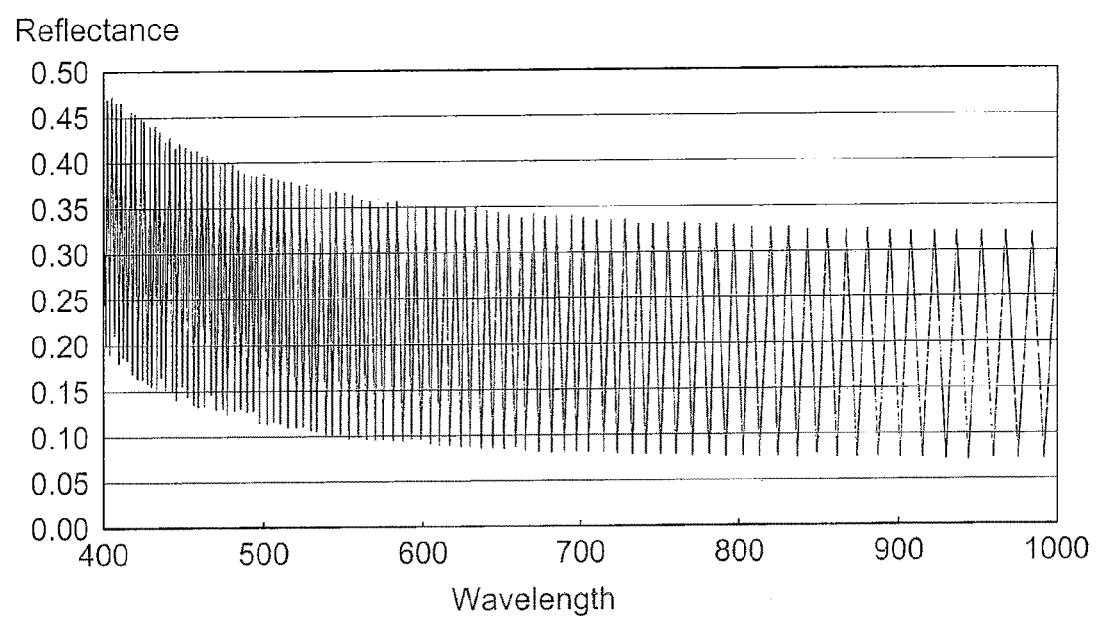
FIG. 13 is a schematic view of an ideal reflectance wavelength function S($\lambda$) obtained by calculation according to the present invention.

Therefore, an ideal (without being spread) reflectance wavelength function being S(λ) can be obtained by reduction with the method of the present invention, as shown in FIG. 13. Then, the curve fitting is performed to obtain more accurate film thickness measurement value.

The film thickness measurement is performed with the method of the present invention, and the accuracy thereof is compared with that of the film thickness obtained by measuring with a thickness gauge of MP100-ME type manufactured by Mission Peak Optics Company, which is calibrated by a calibration standard of National Institute of Standards and Technology (NIST). The comparison results are listed the following table. The measurement system of MP100-ME merely performs a single point measurement at a time, and the present invention adopts the measurement system in US Patent Publication NO. 2006/0077385 (i.e., Taiwan Patent NO. I245114) proposed by the inventor to perform a linear measurement at a time. In this comparison, the two systems perform detections on the same region of a testing piece, the MP100-ME system performs 7 measurements on 7 channel regions in a 2 μm standard region, and in the present invention measurements are also performed on the same region, and the comparison of measurement results is listed in the following table.

| Position | MP100-ME d (um) | The Present Invention d (um) | Error d (nm) |
| --- | --- | --- | --- |
| Ch1 | 1.9069 | 1.9150 | 8.1 |
| Ch2 | 1.9065 | 1.9151 | 8.6 |
| Ch3 | 1.9066 | 1.9157 | 9.1 |
| Ch4 | 1.9064 | 1.9146 | 8.2 |
| Ch5 | 1.9067 | 1.9154 | 8.7 |
| Ch6 | 1.9068 | 1.9156 | 8.8 |
| Ch7 | 1.9061 | 1.9150 | 8.9 |

It can be known from the above table that the measurement has good consistency and stability, thus obviously solving the problem of poor spectral resolution in the prior art.

Figure 8:
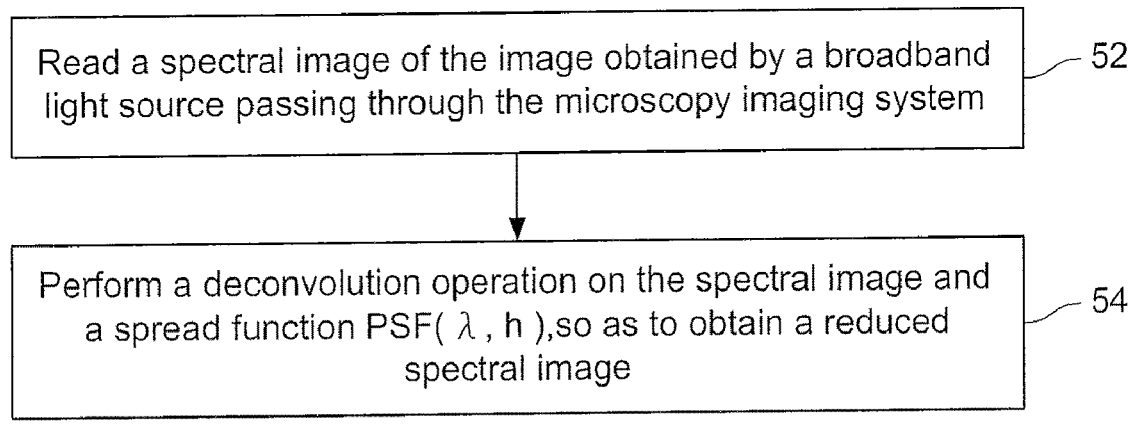
FIG. 8 is a schematic flow chart of processes of a spectral image processing method according to the present invention.

Further, in order to solve the problem that the image spatial resolution is poor due to optical aberration, the present invention further provides a spectral image processing method for improving the spatial resolution. In this method, a microscopy imaging system is used to read an image, and the microscopy imaging system can be, but not limited to, the microscopy imaging (measuring) system shown in FIGS. 5, 6A, and 6B. Referring to FIG. 8, the spectral image processing method includes the following steps.

In Step 52, an original spectral image obtained by a broadband light source passing through the microscopy imaging system is read. In Step 54, a deconvolution operation is performed on the original spectral image and a spread function PSF(λ, h), so as to obtain a reduced spectral image. The reduced spectral image is a spectral image with high spatial resolution.

The original spectral image read in the Step 52 is illustrated herein below. The photo-detecting element 29, but not limited to, is described by way of example, the photo-detecting element 29 will read the spectral image corresponding to each object height position of the slit 240 (that is, various positions of the slit 240, which will be described in detail below), the horizontal axis of the spectral image represents the wavelength, the vertical axis thereof represents the spatial axis, and the spatial axis is corresponding to the object height from top to bottom. If the photo-detecting element 29 is a grayscale reading element, each point read by the photo-detecting element 29 is corresponding to one object height, and the grayscale value of the point is corresponding to (represents) a reflectance. Therefore, two-dimensional point combinations of the spectral image represent reflectance values at different object heights and different wavelengths. That is to say, a broadband reflectance wavelength function M(λ) can be obtained corresponding to an object height (a specific position of the slit), and the spectral image is the collection of all broadband reflectance wavelength functions M(λ) corresponding to various object heights.

The spread function PSF(λ, h) is the spread function PSF (λ, h) of spatial axis points obtained by various wavelengths in the wavelength range of the broadband light source passing through the microscopy imaging system to various object heights in a specific object height range. That is to say, if the wavelength range of the broadband light source is 350-850 nm, with a wavelength interval of 1 nm or 10 nm depending on the required accuracy. The wavelength interval of 10 nm is described by way of example, the specific object height refers to the images (reflectance values) read from different height of the slit 240. For example, as for a slit 240 having a length of 6.6 mm, the top of the slit 240 is considered as an origin (i.e., 0 μm) of the object height, and the light slit 240 has an interval of 20 μm, the interval depends on the resolution of the photo-detecting element 29 and various lenses on the optical path of the image reading. Therefore, an interval of 20 μm is described by way of example, which can also be, but not limited to, 10 μm, 30 μm etc. When generating the above spread function, light sources having wavelengths of 350 nm, 360 nm, 370 nm, . . . , 850 nm respectively pass through the microscopy imaging system to read the spread spectral images at various object heights of 0 μm, 20 μm, 40 μm, . . . , 6600 μm (6.6 mm), and thus the spread spectral images at different wavelengths and different object heights can be obtained. After the mathematic operation, the above wavelength-object height spread function may be obtained for the processing of the original spectral image.

The principle of improving the spatial image resolution is similar to that of improving the spectral resolution, which will not be repeated herein.

Further, the method of the present invention is capable of improving the spectral resolution and the spatial image resolution at the same time, that is, the spectral image processing method of the present invention is integrated with the reflective film thickness measurement method. A user may process the spectral image with the present invention, performs the above Steps 40-48 to obtain the image of high spatial image resolution and the function of high spectral resolution, and performs the fitting on the function of spectral resolution and the above general expression, so as to obtain the accurate film thickness.

The steps of cooperating the methods of the present invention are described as follows.

In Step 52, an original spectral image of the image obtained by a broadband light source passing through the microscopy imaging system is read. In Step 54, a deconvolution operation is performed on the original spectral image and a spread function PSF($\lambda$, h) (for spatial axis), so as to obtain a reduced spectral image. In Step 40, the above reduced spectral image is required to perform function capture, that is, a broadband reflectance wavelength function M($\lambda$) is captured from the reduced spectral image. In Step 42, the broadband reflectance wavelength function M($\lambda$) is transformed into a broadband frequency-domain function M(f). In Step 44, the broadband frequency-domain function M(f) is divided by a single-wavelength frequency-domain function h(f), so as to obtain an ideal frequency-domain function S(f). In Step 46, the ideal frequency-domain function S(f) is inverse-transformed into an ideal reflectance wavelength function S($\lambda$). In Step 48, a curve fitting is performed on the ideal reflectance wavelength function S($\lambda$) and a reflectance wavelength thickness general expression, so as to obtain a thickness of the thin film.

In another embodiment of the present invention, the method of improving the spectral resolution and the method of improving the spatial image resolution are performed to obtain a more accurate film thickness value. This embodiment is a reflective film thickness measurement method, which includes the following steps.

In Step 60, an original spectral image I($\lambda$, h) obtained by measuring a thin film with a broadband light source passing through a measurement system is read, and the original spectral image I($\lambda$, h) includes reflectance values corresponding to various object heights of a slit in the microscopy imaging system and corresponding to various wavelengths of the broadband light source.

In Step 62, a deconvolution operation is performed on the original spectral image I($\lambda$, h) and a two-dimensional spread integrated function PSF2($\lambda$, h), so as to obtain a reduced spectral image I'($\lambda$, h).

In Step 64, an ideal reflectance wavelength function S($\lambda$) corresponding to a specific object height is captured from the reduced spectral image I'($\lambda$, h).

In Step 66, a curve fitting is performed on the ideal reflectance wavelength function S($\lambda$) and a reflectance wavelength thickness general expression, so as to obtain a thickness of the thin film corresponding to the specific object height.

Figure 1:
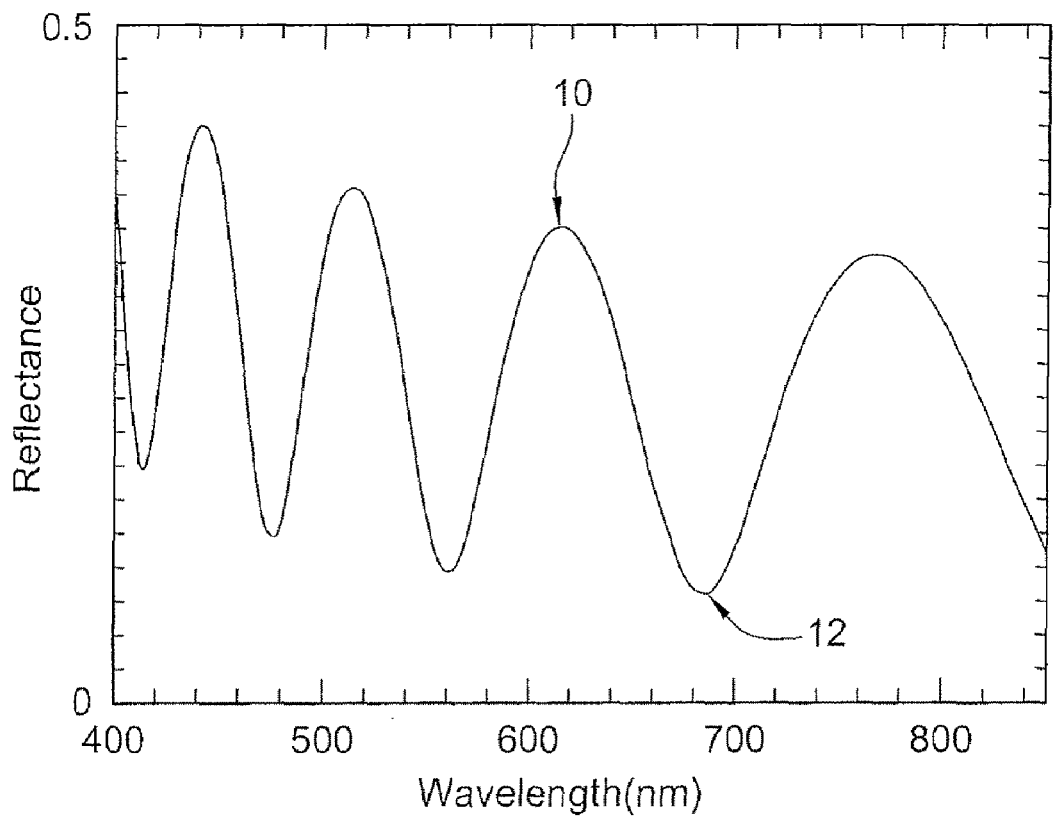
FIG. 1 is a schematic view of a conventional reflectance interference spectrum.
Figure 2A:
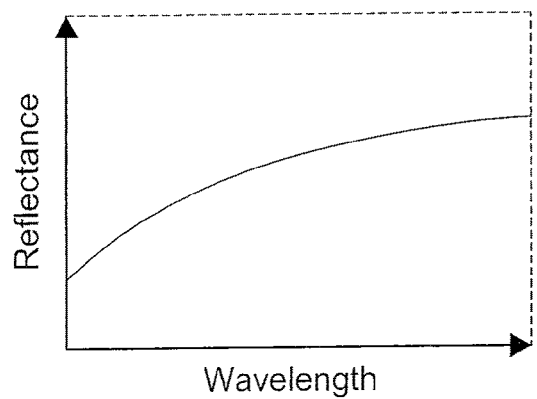
FIGS. 2A, 2B, 2C are schematic views of relationship between the conventional reflectance interference spectrum and a film thickness.
Figure 2B:
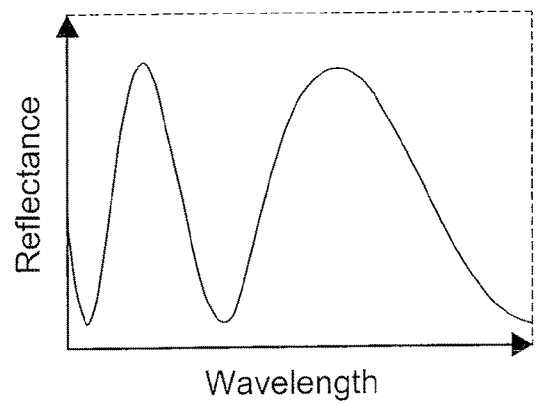
Figure 2C:
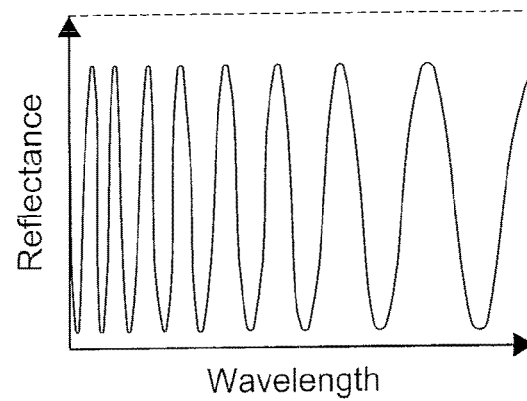
Figure 15:
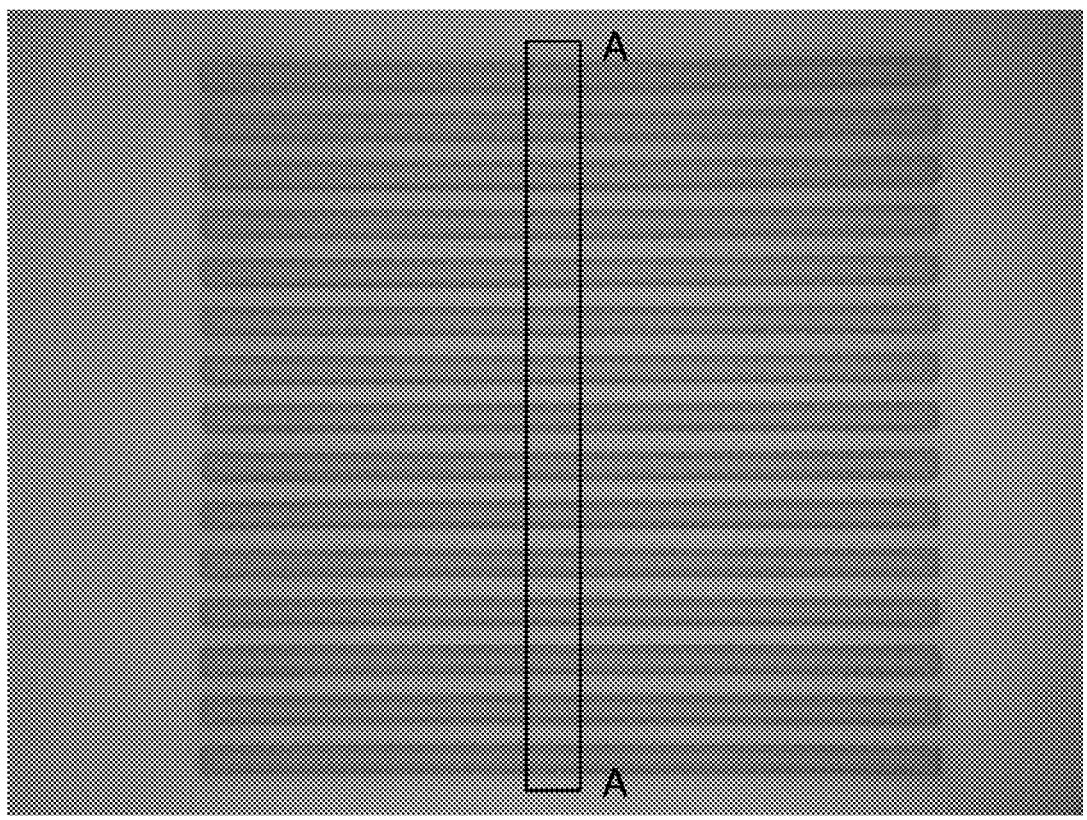
FIG. 15 is a schematic view of a physical image of a thin film measured by a reflective film thickness measurement method according to another embodiment of the present invention.
Figure 16:
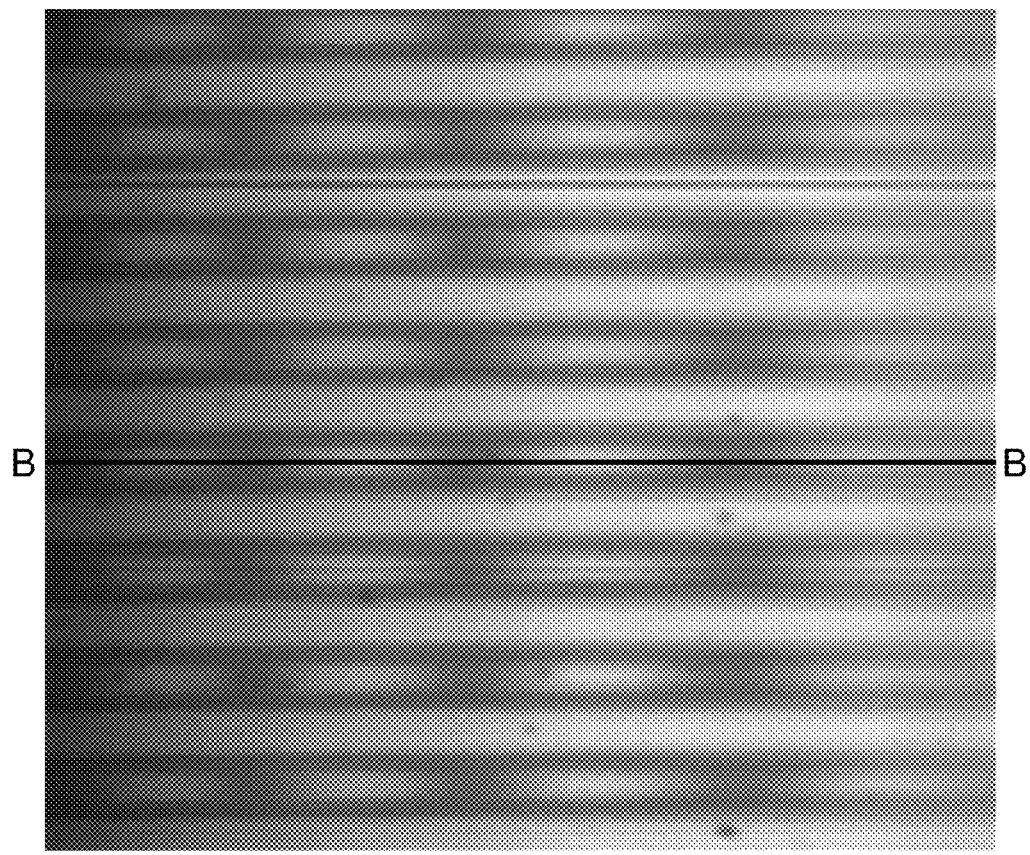
FIG. 16 is a schematic view of an original spectral image read by measuring a thin film with a broadband light source passing through a measurement system by using a reflective film thickness measurement method according to another embodiment of the present invention.

The broadband light source may have, but not limited to, a wavelength range of 350-850 nm, the measurement system may be, but not limited to, a microscopy imaging system, and the architecture of the microscopy imaging system may be, but not limited to, the spectral image measurement system shown in FIG. 5. The slit is correspondingly the light slit 240 of FIG. 5, and various object heights are the positions in the long axis direction of the light slit 240. For example, if the light slit 240 has a length of 6.6 mm, with an interval of 40 µm from top to bottom, and the various object heights are respectively 0 µm, 40 µm, 80 µm, 120 µm, . . . , 6.6 mm. Therefore, in Step 60, the above spectral image measurement system is used to measure the original spectral image formed by reflected optical signals after the broadband light source is irradiated to a thin film (as shown in FIG. 15). FIG. 15 is a schematic view of a physical image of a thin film under measurement, and a block region shown by A-A in the figure is the field of view of the slit, i.e., the range of reading the spectral image once. The original spectral image as shown in Step 60 may be read from the block in FIG. 15, i.e., the view as shown in FIG. 16. The horizontal axis of the original spectral image represents the light wavelength corresponding to the bandwidth range of the broadband spectrum (in FIG. 16, 1-1300 pixels corresponding to 380-960 nm), and the vertical axis thereof presents the object height corresponding to the height in vertical direction of the physical image of FIG. 15.

Figure 17:
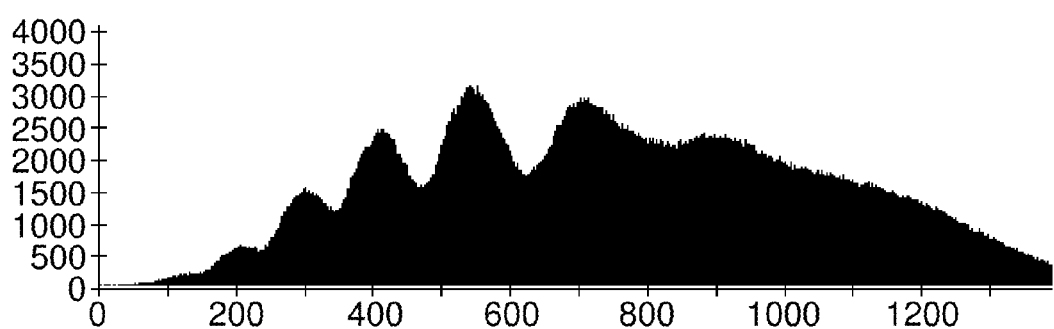
FIG. 17 is a schematic view of a reflectance interference spectrum (before normalization with light source spectrum) of the spectral image in FIG. 16 obtained at an object height of B-B.

It can be seen from FIG. 16 that the original spectral image in the Step 60 includes a plurality of pixels, each corresponding to an object height and a wavelength, and each having an image read value. That is to say, each object height has an image read value corresponding to each wavelength position. As for a grayscale image, the grayscale value thereof is the image read value thereof, and the physical meaning represented by the grayscale value is a reflectance (before normalization with light source spectrum) value obtained at the wavelength and object height position corresponding to the pixel. Therefore, a wavelength reflectance curve diagram (relation diagram) may be obtained at a horizontal section of the same object height (i.e., at a cross-section parallel to the wavelength axis), and the object height at B-B position in FIG. 16 is described by way of example. FIG. 17 is a schematic view of the reflectance interference spectrum (before normalization with light source spectrum) of the original spectral image in FIG. 16 obtained at B-B object height. Referring to FIG. 17, it can be seen that the horizontal axis of the wavelength reflectance curve (before normalization with light source spectrum) is similar the above-mentioned broadband wavelength range, the vertical axis thereof represents the reflectance, and the curve in the figure is the wavelength reflectance curve, which is similar to the above broadband reflectance wavelength function M($\lambda$).

In brief, after the Step 60, an original spectral image I($\lambda$, h) is obtained, and the original spectral image is a function of the light wavelength $\lambda$ and the object height h.

The two-dimensional spread integrated function PSF2($\lambda$, h) in Step 62 is an integrated function of a point spread function in spatial axis (object height axis) dimension and a point spread function in wavelength axis dimension. The point spread function in wavelength axis dimension is a function of spread extent generated after a single-wavelength light source passes through the measurement system, which is the same as the above-mentioned PSF($\lambda$, h). Similarly, a point spread function also exists in the object height (spatial axis) dimension. The two-dimensional spread integrated function PSF2($\lambda$, h) is formed by cooperating the point spread function in object height dimension and the point spread function in wavelength axis dimension, and thus the two-dimensional spread integrated function PSF2($\lambda$, h) may be used to represent the point spread situation of a single wavelength in a two-dimensional direction of wavelength axis and spatial axis (object height axis). That is to say, the two-dimensional spread integrated function PSF2($\lambda$, h) is a convolution of the spread function PSF($\lambda$, h) and a single-wavelength reflectance wavelength function h($\lambda$), that is, PSF2($\lambda$, h)=PSF($\lambda$, h)*h($\lambda$).

From the viewpoint of physical meaning, the spread function PSF($\lambda$, h) is the spread function PSF($\lambda$, h) of spatial axis points obtained by various wavelengths in the wavelength range of the broadband light source passing through the microscopy imaging system to various object heights in a specific object height range. The single-wavelength reflectance wavelength function h($\lambda$) is a reflectance wavelength function h($\lambda$) obtained by reading a single-wavelength light source passing through the microscopy imaging system.

Figure 18:
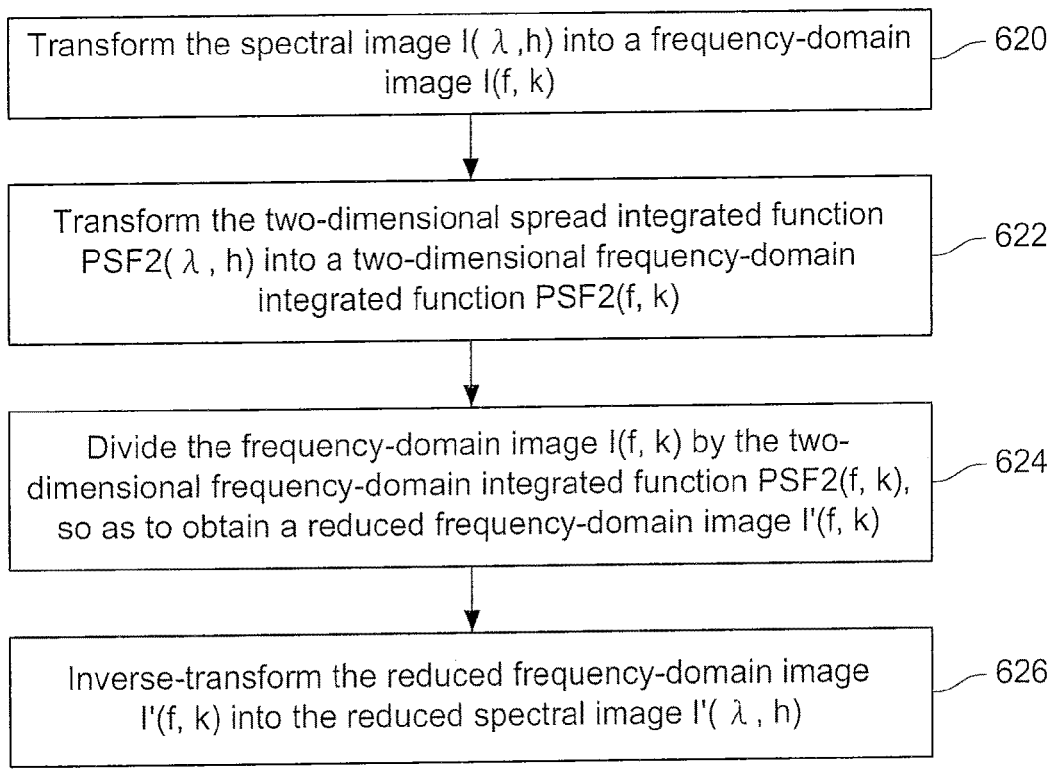
FIG. 18 is a schematic flow chart of processes of Step 62 in the reflective film thickness measurement method according to another embodiment of the present invention.

Referring to FIG. 18, in the Step 62, the process of performing the deconvolution operation on the original spectral image I(λ, h) and a two-dimensional spread integrated function PSF2(λ, h), so as to obtain a reduced spectral image I'(λ, h) includes the following steps.

In Step 620, the spectral image I(λ, h) is transformed into a frequency-domain image I(f, k).

In Step 622, the two-dimensional spread integrated function PSF2(λ, h) is transformed into a two-dimensional frequency-domain integrated function PSF2(f, k).

In Step 624, the frequency-domain image I(f, k) is divided by the two-dimensional frequency-domain integrated function PSF2(f,k), so as to obtain a reduced frequency-domain image I'(f, k).

In Step 626, the reduced frequency-domain image I'(f, k) is inverse-transformed into the reduced spectral image I'(λ, h).

The step of transforming the spectral image I(λ, h) into a frequency-domain image I(f, k) in the Step 620 is performing the Fourier transform or fast Fourier transform on the spectral image I(λ, h) to obtain the frequency-domain image I(f, k). The step of transforming the two-dimensional spread integrated function PSF2(λ,h) into a two-dimensional frequency-domain integrated function PSF2(f, k) in the Step 622 is performing the Fourier transform or fast Fourier transform on the two-dimensional spread integrated function PSF2(λ, h) to obtain the two-dimensional frequency-domain integrated function PSF2(f, k). The step of inverse-transforming the reduced frequency-domain image I'(f, k) into the reduced spectral image I'(λ, h) in the Step 626 is performing the inverse Fourier transform or inverse fast Fourier transform on the reduced frequency-domain image I'(f, k) to obtain the reduced spectral image I'(λ, h).

In Step 624, the process of dividing the frequency-domain image I(f, k) by the two-dimensional frequency-domain integrated function PSF2(f, k) to obtain a reduced frequency-domain image I'(f, k) is identical to the process in the Step 44, so the details will not be repeated herein, and has the same purpose of the Step 44, that is, eliminating the point spread at spatial axis (object height axis) and wavelength axis generated when measuring the thin film with the broadband light source passing through the measurement system, so as to obtain the ideal frequency-domain image function.

Figure 14:
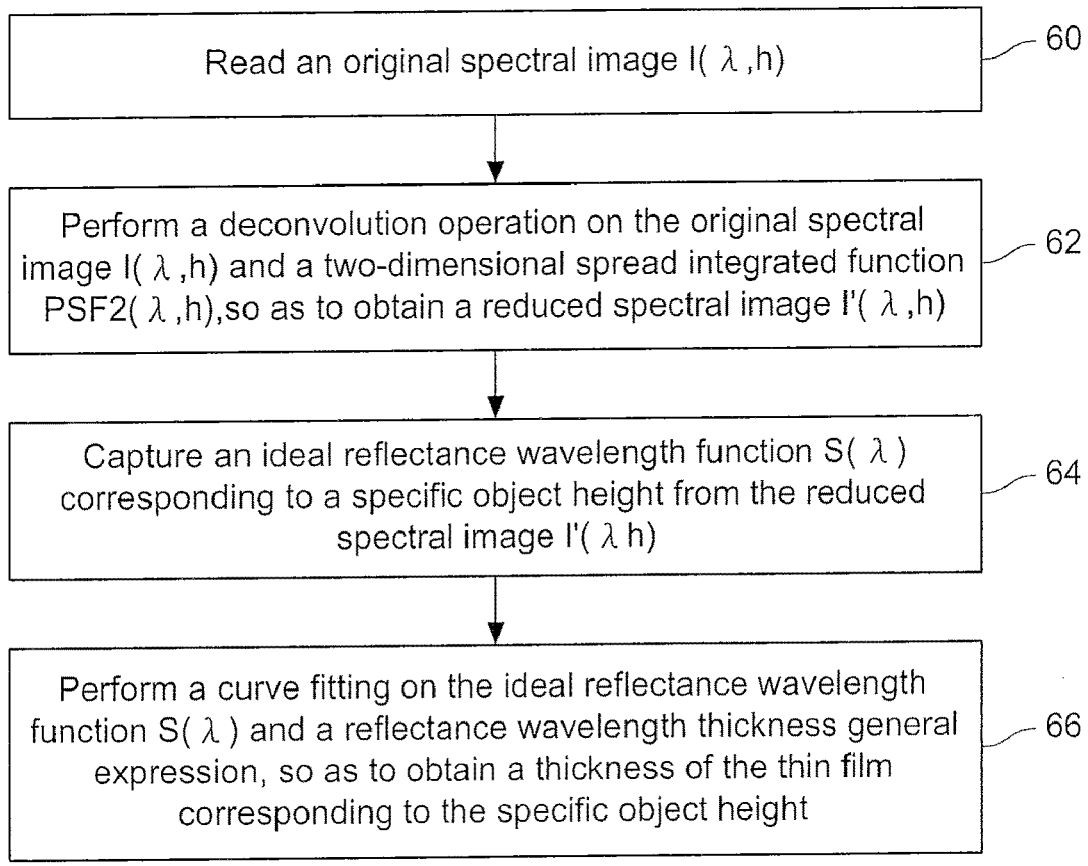
FIG. 14 is a schematic flow chart of processes of a reflective film thickness measurement method according to another embodiment of the present invention.

In the Step 64 of capturing an ideal reflectance wavelength function S(λ) corresponding to a specific object height from the reduced spectral image I'(λ, h), the reduced spectral image I'(λ, h) is the spectral image function after eliminating the point spread at the spatial axis (object height axis) and wavelength axis, and the schematic view of the reduced spectral image is similar to the schematic view of the original spectral image in FIG. 14, only except that the reduced spectral image has removed the point spread at the spatial axis (object height axis) and wavelength axis. Therefore, when capturing an ideal reflectance wavelength function S(λ) corresponding to a specific object height (a specific spatial position) from the reduced spectral image I'(λ, h), the ideal reflectance wavelength function S(λ) corresponding to the object height has removed the point spread at the wavelength axis, and the schematic view of this function is shown in FIG. 13.

In the Step 66, the process of performing the curve fitting on the ideal reflectance wavelength function S(λ) and a reflectance wavelength thickness general expression to obtain a thickness of the thin film corresponding to the specific object height is the same as that in Step 48, so the details will not be repeated herein. At this time, the film thickness of the thin film under measurement corresponding to the object height is obtained.

Figure 19:
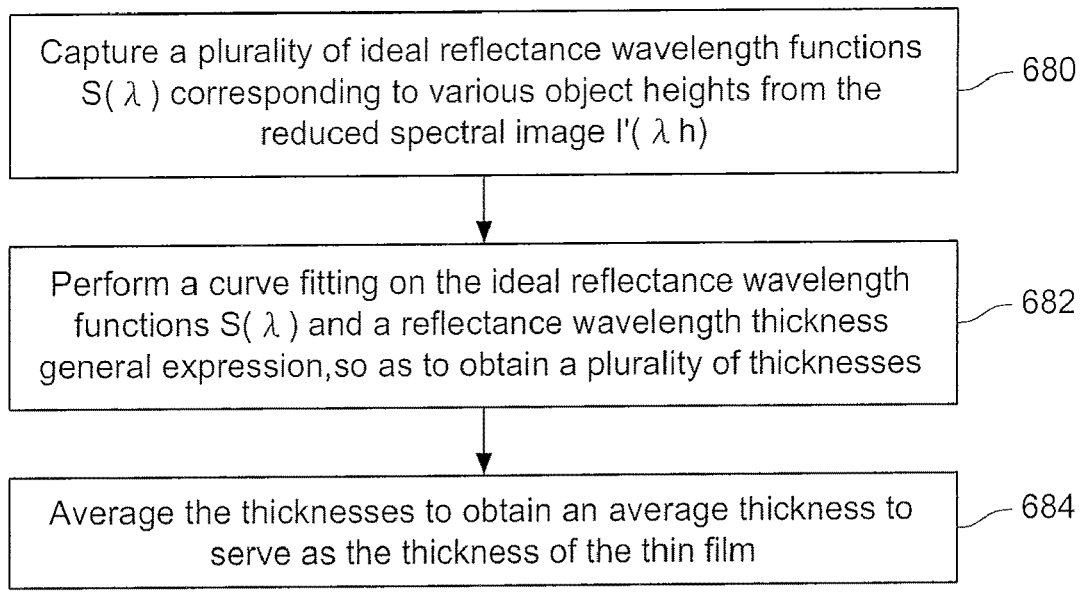
FIG. 19 is a schematic flow chart of processes of calculating an average thickness of the thin film with the reflective film thickness measurement method according to another embodiment of the present invention.

In order to obtain more accurate thin film thickness, the Steps 64-66 may be repeated. The ideal reflectance wavelength functions S(λ) corresponding to various object heights are captured, and the thin film thickness corresponding to various object height positions are obtained after the curve fitting. Thereafter, the various thin film thicknesses are added and averaged, so as to obtain an average thin film thickness. Referring to FIG. 19, the process is described in detail below (the following steps are performed after Step 66).

In Step 680, a plurality of ideal reflectance wavelength functions S(λ) corresponding to various object heights is captured from the reduced spectral image I'(λ, h).

In Step 682, a curve fitting is performed on the ideal reflectance wavelength functions S(λ) and a reflectance wavelength thickness general expression, so as to obtain a plurality of thicknesses.

In Step 684, the thicknesses are averaged to obtain an average thickness to serve as the thickness of the thin film.

After performing the Steps 680-684, in addition that the average thickness of the thin film is calculated, statistic information such as standard differences or variables can also be obtained, so as to clearly know the flatness of the thin film in the object height range and other information. If the thin film thicknesses corresponding to various object heights are not used to perform calculation, it is means that the thicknesses of the thin film correspond to various object heights.

What is claimed is:

1. A reflective film thickness measurement method, comprising:

obtaining a broadband reflectance wavelength function M(λ) by passing broadband light, emitted by a broadband light source, through a thin film in a measurement system;

transforming, by the measurement system, the broadband reflectance wavelength function M(λ) into a broadband frequency-domain function M(f);

dividing, by the measurement system, the broadband frequency-domain function M(f) by a single-wavelength frequency-domain function h(f), so as to obtain an ideal frequency-domain function S(f);

inverse-transforming, by the measurement system, the ideal frequency-domain function S(f) into an ideal reflectance wavelength function S(λ); and performing, by the measurement system, a curve fitting on the ideal reflectance wavelength function S(λ) and a reflectance wavelength thickness general expression, so as to obtain a thickness of the thin film.

2. The reflective film thickness measurement method according to claim 1, wherein the single-wavelength frequency-domain function h(f) is obtained by:

obtaining a single-wavelength reflectance wavelength function h(λ) by passing single-wavelength light, emitted by a single-wavelength light source, through the measurement system; and transforming, by the measurement system, the single-wavelength reflectance wavelength function h(λ) into the single-wavelength frequency-domain function h(f).

3. The reflective film thickness measurement method according to claim 2, wherein the transform of the single-wavelength reflectance wavelength function h(λ) is a Fourier transform or a fast Fourier transform.

4. The reflective film thickness measurement method according to claim 1, wherein the transform of the broadband reflectance wavelength function M(λ) is a Fourier transform or a fast Fourier transform.

5. The reflective film thickness measurement method according to claim 1, wherein the inverse transform is an inverse Fourier transform or an inverse fast Fourier transform.

6. The reflective film thickness measurement method according to claim 1, wherein the reflectance wavelength thickness general expression is a general function expression of a wavelength and a film thickness deduced from a Fresnel Equation.

7. A spectral image processing method, comprising:
obtaining an original spectral image by passing broadband light, emitted by a broadband light source, through a microscopy imaging system; and
performing, by the microscopy imaging system, a deconvolution operation on the original spectral image and a spread function PSF($\lambda$, h), so as to obtain a reduced spectral image.

8. The spectral image processing method according to claim 7, wherein the spread function PSF($\lambda$, h) is a spread function PSF($\lambda$, h) of spatial axis points obtained by various wavelengths in a wavelength range of the broadband light passing through the microscopy imaging system to various object heights in a specific object height range.

9. The spectral image processing method according to claim 7, wherein the spread function PSF($\lambda$, h) is a spatial axis point spread function PSF($\lambda$, h).

10. The spectral image processing method according to claim 7, wherein the microscopy imaging system is an image spectrometer.

11. A reflective film thickness measurement method, comprising:
obtaining an original spectral image by passing broadband light, emitted by a broadband light source, through a microscopy imaging system;
performing, by the microscopy imaging system, a deconvolution operation on the original spectral image and a spread function PSF($\lambda$, h), so as to obtain a reduced spectral image;
capturing, by the microscopy imaging system, a broadband reflectance wavelength function M($\lambda$) from the reduced spectral image;
transforming, by the microscopy imaging system, the broadband reflectance wavelength function M($\lambda$) into a broadband frequency-domain function M(f);
dividing, by the microscopy imaging system, the broadband frequency-domain function M(f) by a single-wavelength frequency-domain function h(f), so as to obtain an ideal frequency-domain function S(f);
inverse-transforming, by the microscopy imaging system, the ideal frequency-domain function S(f) into an ideal reflectance wavelength function S($\lambda$); and
performing, by the microscopy imaging system, a curve fitting on the ideal reflectance wavelength function S($\lambda$) and a reflectance wavelength thickness general expression, so as to obtain a thickness of the thin film.

12. The reflective film thickness measurement method according to claim 11, wherein the spread function PSF($\lambda$, h) is a spread function PSF($\lambda$, h) of spatial axis points obtained by various wavelengths in the wavelength range of the broadband light passing through the microscopy imaging system to various object heights in a specific object height range.

13. The reflective film thickness measurement method according to claim 11, wherein the spread function PSF($\lambda$, h) is a spatial axis point spread function PSF($\lambda$, h).

14. The reflective film thickness measurement method according to claim 11, wherein the microscopy imaging system is an image spectrometer.

15. The reflective film thickness measurement method according to claim 11, wherein the single-wavelength frequency-domain function h(f) is obtained by:
obtaining a single-wavelength reflectance wavelength function h($\lambda$) by passing single-wavelength light, emitted by a single-wavelength light source, through the microscopy imaging system; and
transforming, by the microscopy imaging system, the single-wavelength reflectance wavelength function h($\lambda$) into the single-wavelength frequency-domain function h(f).

16. The reflective film thickness measurement method according to claim 15, wherein the transform is a Fourier transform or a fast Fourier transform.

17. The reflective film thickness measurement method according to claim 11, wherein the transform is a Fourier transform or a fast Fourier transform.

18. The reflective film thickness measurement method according to claim 11, wherein the inverse transform is an inverse Fourier transform or an inverse fast Fourier transform.

19. The reflective film thickness measurement method according to claim 11, wherein the reflectance wavelength thickness general expression is a general function expression of a wavelength and a film thickness deduced from a Fresnel Equation.

20. A reflective film thickness measurement method, comprising:
obtaining an original spectral image I($\lambda$, h) by passing broadband light, emitted by a broadband light source, through a thin film in a measurement system, wherein the original spectral image I($\lambda$, h) comprises reflectance values of various object heights of a slit in the microscopy imaging system to corresponding various wavelengths of the broadband light source;
performing, by the measurement system, a deconvolution operation on the original spectral image I($\lambda$, h) and a two-dimensional spread integrated function PSF2($\lambda$, h), so as to obtain a reduced spectral image I'($\lambda$, h);
capturing, by the measurement system, an ideal reflectance wavelength function S($\lambda$) corresponding to a specific object height from the reduced spectral image I'($\lambda$, h); and
performing, by the measurement system, a curve fitting on the ideal reflectance wavelength function S($\lambda$) and a reflectance wavelength thickness general expression, so as to obtain a thickness of the thin film corresponding to the specific object height.

21. The reflective film thickness measurement method according to claim 20, wherein the two-dimensional spread integrated function PSF2($\lambda$, h) is an integrated function of a point spread function in a spatial axis (object height axis) dimension and a point spread function (PSF) in a wavelength axis dimension.

22. The reflective film thickness measurement method according to claim 21, wherein the two-dimensional spread integrated function PSF2($\lambda$, h) is obtained by multiplying a spread function PSF($\lambda$, h) and a single-wavelength reflectance wavelength function h($\lambda$).

23. The reflective film thickness measurement method according to claim 22, wherein the spread function PSF($\lambda$, h) is a spread function PSF($\lambda$, h) of spatial axis points obtained by various wavelengths in the wavelength range of the broadband light passing through the microscopy imaging system to various object heights in a specific object height range.

24. The reflective film thickness measurement method according to claim 22, wherein the single-wavelength reflectance function h($\lambda$) is a reflectance wavelength function h(λ) obtained by a single-wavelength light source passing through the microscopy imaging system.

25. The reflective film thickness measurement method according to claim 20, wherein the process of performing a deconvolution operation on the original spectral image I(λ, h) and a two-dimensional spread integrated function PSF2(λ, h) to obtain a reduced spectral image I'(λ, h) comprises:
    transforming the original spectral image I(λ, h) into a frequency-domain image I(f, k);
    transforming the two-dimensional spread integrated function PSF2(λ, h) into a two-dimensional frequency-domain integrated function PSF2(f, k);
    dividing the frequency-domain image I(f, k) by the two-dimensional frequency-domain integrated function PSF2(f, k), so as to obtain a reduced frequency-domain image I'(f, k); and
    inverse-transforming the reduced frequency-domain image I'(f, k) into the reduced spectral image I'(λ, h).

26. The reflective film thickness measurement method according to claim 25, wherein the process of transforming the original spectral image I(λ, h) into a frequency-domain image I(f, k) comprises performing the Fourier transform or fast Fourier transform on the original spectral image I(λ, h) to obtain the frequency-domain image I(f, k).

27. The reflective film thickness measurement method according to claim 25, wherein the process of transforming the two-dimensional spread integrated function PSF2(λ, h) into a two-dimensional frequency-domain integrated function PSF2(f, k) comprises performing the Fourier transform or fast Fourier transform on the two-dimensional spread integrated function PSF2(λ, h) to obtain the two-dimensional frequency-domain integrated function PSF2(f, k).

28. The reflective film thickness measurement method according to claim 25, wherein the process of inverse-transforming the reduced frequency-domain image I'(f, k) into the reduced spectral image I'(λ, h) comprises performing the inverse Fourier transform or inverse fast Fourier transform on the reduced frequency-domain image I'(f, k) to obtain the reduced spectral image I'(λ, h).

29. The reflective film thickness measurement method according to claim 20, after the process of performing a curve fitting on the ideal reflectance wavelength function S(λ) and a reflectance wavelength thickness general expression to obtain a thickness of the thin film, further comprising:
    capturing a plurality of the ideal reflectance wavelength functions S(λ) respectively corresponding to each of the object heights from the reduced spectral image I'(λ, h);
    performing the curve fitting on the ideal reflectance wavelength functions S(λ) and a reflectance wavelength thickness general expression, so as to obtain a plurality of thickness; and
    averaging the thicknesses to obtain an average thickness to serve as the thickness of the thin film.

* * * * *